(12) United States Patent
Nishida

(10) Patent No.: US 6,909,522 B1
(45) Date of Patent: Jun. 21, 2005

(54) PRINTING APPARATUS

(75) Inventor: Shinsuke Nishida, Tokyo (JP)

(73) Assignee: Fourie, Inc., Tokyo (JP)

( * ) Notice: Subject to any disclaimer, the term of this patent is extended or adjusted under 35 U.S.C. 154(b) by 0 days.

(21) Appl. No.: 09/148,773

(22) Filed: Sep. 4, 1998

(30) Foreign Application Priority Data

Oct. 3, 1997 (JP) .............................................. 9-271613

(51) Int. Cl.$^7$ .............................. G06F 15/00; G06K 1/00
(52) U.S. Cl. ....................... 358/1.9; 358/298; 358/1.16; 358/1.9; 358/1.12; 358/1.17; 358/1.15; 358/2.1; 358/1.11; 358/1.2
(58) Field of Search ................................ 358/298, 1.16, 358/1.9, 1.12, 1.17, 2.1, 1.2, 1.13, 1.11, 1.15

(56) References Cited

U.S. PATENT DOCUMENTS

| | | | | |
|---|---|---|---|---|
| 3,921,164 A | * | 11/1975 | Anderson | 358/296 |
| 4,242,678 A | * | 12/1980 | Somerville | 358/444 |
| 4,847,641 A | * | 7/1989 | Tung | 358/296 |
| 4,912,562 A | * | 3/1990 | Fenster et al. | 358/3.01 |
| 4,978,971 A | * | 12/1990 | Goetz et al. | 347/5 |
| 5,105,280 A | * | 4/1992 | Ogino et al. | 358/298 |
| 5,161,035 A | * | 11/1992 | Muramatsu | 358/451 |
| 5,228,098 A | * | 7/1993 | Crinon et al. | 382/240 |
| 5,271,071 A | * | 12/1993 | Waite | 382/244 |
| 5,289,564 A | * | 2/1994 | Morimoto et al. | 358/1.9 |
| 5,440,401 A | * | 8/1995 | Parulski et al. | 386/124 |
| 5,949,453 A | * | 9/1999 | Harris et al. | 347/43 |
| 6,002,848 A | * | 12/1999 | Takahashi | 358/1.17 |
| 6,011,878 A | * | 1/2000 | Ushida et al. | 358/298 |
| 6,016,154 A | * | 1/2000 | Moroo et al. | 358/444 |
| 6,088,512 A | * | 7/2000 | Ancin et al. | 358/1.9 |
| 6,091,511 A | * | 7/2000 | Ben Dror et al. | 358/1.9 |
| 6,184,997 B1 | * | 2/2001 | Hanyu et al. | 358/1.15 |
| 6,256,109 B1 | * | 7/2001 | Rosenbaum et al. | 358/1.2 |
| 6,594,026 B2 | * | 7/2003 | MacDonald | 358/1.12 |
| 6,597,471 B1 | * | 7/2003 | Yoshikawa | 358/1.2 |

FOREIGN PATENT DOCUMENTS

| | | |
|---|---|---|
| JP | 5-96792 A | 4/1993 |
| JP | 7-28991 A | 1/1995 |
| JP | 8-39864 A | 2/1996 |
| JP | 9-116775 A | 5/1997 |

\* cited by examiner

*Primary Examiner*—Scott Rogers
*Assistant Examiner*—Ashanti Ghee
(74) *Attorney, Agent, or Firm*—Sughrue Mion, PLLC

(57) ABSTRACT

A display signal for character "A" has a structure comprising multiple layers (layers a to d) at the resolution of, for instance, level n to level n+3. The higher the level is, the high resolution of a print image is. A display signal at a required level is selected according to a purpose of printing. When a desired level is selected, a corresponding layer is extracted by a format changing section. For instance, when the level n+2 is selected, the layer c is extracted. Printing is executed with the resolution at this level n+2. Selection of resolution can be made in the side of the printing apparatus.

9 Claims, 9 Drawing Sheets

| PRINT RESOLUTION INFORMATION | ADDRESS INFORMATION | PRINT DATA INFORMATION |
|---|---|---|

PRINTING APPARATUS

FIELD OF THE INVENTION

The present invention relates to a printing apparatus, and more particularly to a printing apparatus capable of efficiently transferring print data and printing the print data by changing resolution according to the necessity.

BACKGROUND OF THE INVENTION

A printing apparatus is generally incorporated in a rear section of a word processor or is connected to a personal computer through a cable thereof. In recent years, various types of printing apparatus have been introduced into the market, and the products are mostly based on the dot matrix system in which an image is formed by printing many small and thin dots on a printing medium. The thinner and smaller the dots are, the more beautifully characters and drawings can be printed. There are many printing systems including, but not limited to, the thermal head system in which thermal dots are formed by a heat-generating resistor, laser printer system in which dots are formed with a laser beam, and ink-jet printer system in which fine particles of ink are blown to a surface of a form.

FIG. 10 is a block diagram showing one example of the conventional type of printing apparatus. This printing apparatus 500 is a general dot matrix printer. Print data transmitted from a computer C is once stored in a buffer 501 incorporated in the printing apparatus 500. When the buffer 501 is full, a control section 505 of the printing apparatus 500 sends a control signal to the computer C, and data transmission is once stopped. When print data is character data (ASCII code), character data having a corresponding dot pattern is selected from a bit map table in a font 502 and transmitted to the control section 505. The control section 505 drives a print head 503 according to received print data for an image or a character. The print head 503 has a structure in which a plurality of pins are arrayed in a row and the pins are moved toward paper by magnetism. When the moved pins contact the an ink ribbon, ink is placed on a form in the contrary side and an image is formed there.

FIG. 11 is a reference view for illustrating a data transfer system of the printing apparatus 100. The image shown in the figure comprises a group of thin dots g. When printing an image, print data for each unit dot constituting the image is sent from the computer C to the printing apparatus 500. Also when printing a character, print data is sent dot by dot according to a bit map font. A dot position is identified by XY addresses on a form. A physical limit of resolution of a print image is a size of the dot g as the minimum unit, but the resolution can be made higher by changing the way of printing the dots.

With the printing apparatus 500 based on the conventional technology, however, all print data is sent dot by dot, so that a data rate is generally large. For this reason, a long time is required for data transfer, which is disadvantageous. Also the buffer 501 easily enters the busy state, which in turn results in deterioration of efficiency in a printing work.

Further, resolution of a print image is uniform, and the resolution can not be changed freely. For this reason, when an image not requiring high resolution is printed, a volume of transmitted print data becomes excessive, and on the other hand, when an image is printed in a zoomed-up form and high resolution is required, the resolution can not be made higher than a certain value, and a satisfactory image can not be obtained for printing, which is disadvantageous.

SUMMARY OF THE INVENTION

It is an object of the present invention to provide a printing apparatus which can transfer image data efficiently and print images changing resolution according to the necessity.

With the present invention, an image can be formed by giving a specific address (any format is allowable) to each dot and identifying the address. Namely, so long as there is correlation between a dot and an address, an image can be formed by identifying the address. Even when the address is changed, an image can be formed by identifying the changed address. An address may be given to a plurality of dots, so that a data rate can be reduced and data transfer can be made efficiently. Further resolution of a print image can freely be set according to the address set state.

With the present invention, a fine image can be printed with smaller divided units by repeatedly dividing a print surface to form a divided unit surface area, identifying each divided unit surface area in each division step with a bit, printing, for instance, the background section with larger divided unit surface areas and fine sections with smaller divided unit surface areas. For this reason, it is not required to print an entire image with fine divided unit print surfaces. With this configuration, it is possible to reduce a volume of print data. Also by preparing print data for each division step, it is possible to print images with required resolution.

With the present invention, for instance a background section can be printed with low resolution print data, and fine sections can be printed with high resolution print data. Namely printing corresponding to the resolution can be made, and also a volume of print data can be reduced.

With the present invention, a volume of data can be suppressed by printing, for instance, a background portion with larger divided unit surface areas and fine portions with smaller divided unit surface areas. As division is executed repeatedly, an image with smaller divided unit surface areas has high resolution. When laying out an image, the image may be formed with larger divided unit surface areas. Then data rate can be reduced. Further, when print data is supplied to each divided unit surface area identified according to an address, if a given address is changed, print data can be supplied to the changed address. For this reason, print image can easily be moved.

With the present invention, desired resolution for printing can be set by selecting an arbitrary division level. For instance, if an early division level is selected, a divided unit surface area becomes large and resolution of an obtained print image becomes lower. On the other hand, if a division level in a later dividing step is selected, a divided unit surface area becomes smaller, and resolution of an obtained print image becomes higher.

With the present invention, division of each unit surface area is made by quartering. An address is expressed with 2 bits. When an address is expressed with 2 bits, treatment of a format becomes easier.

With the present invention, a print image is formed with a group of dots. For this reason, a unit dot is a physical limit of division of a unit surface area. So by changing the dot-forming state, the same effect as division can be obtained. For instance, dot size may be made smaller, or density of ink used for printing may be made thinner.

Other objects and features of this invention will become understood from the following description with reference to the accompanying drawings.

DESCRIPTION OF THE PREFERRED EMBODIMENTS

Next detailed description is made for an embodiment of the present invention with reference to the related drawings. It should be noted that the present invention is not limited to this embodiment.

Figure 1:
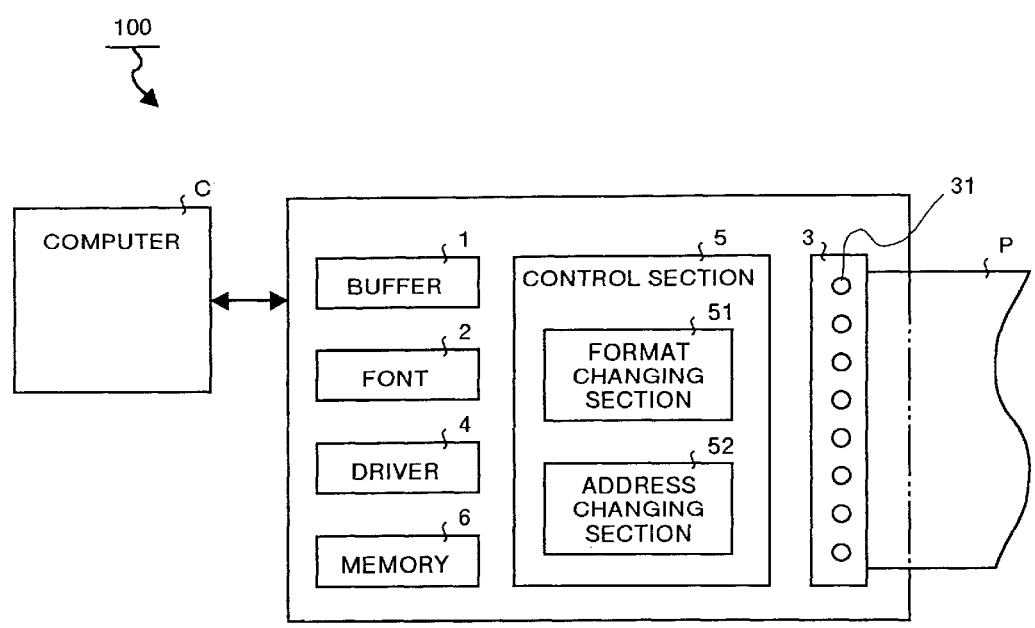
FIG. 1 is a general block diagram showing a printing apparatus according to an embodiment of the present invention.

FIG. 1 is a general block diagram showing a printing apparatus according to an embodiment of the present invention. This printing apparatus 100 comprises a buffer 1 for temporally storing therein print data sent from a computer C, a font 2 having various types of bit map table, a print head 3 having a plurality of pins 31 arrayed in a row, a driver 4 for driving the print head 3, and a control section 5 for controlling operations of the printing apparatus 100. Further this control section 5 has a format changing section 51 and an address changing section 52 which are features of this invention. Information on the format and addresses are stored in a memory 6.

Print data sent from the computer C is temporally stored in the buffer 1 in the printing apparatus 100. When print data is character data, character data having a corresponding dot pattern is selected from a bit map table in the font 2 and sent to the control section 5. The control section 5 drives the print head 3 with a driver 4 according to the received print data for an image or a character. When the pins 31 of the print head 3 move and the prints thereof contact an ink ribbon (not shown), the ink is placed on a form P in the contrary side and an image is formed there.

Figure 2A:
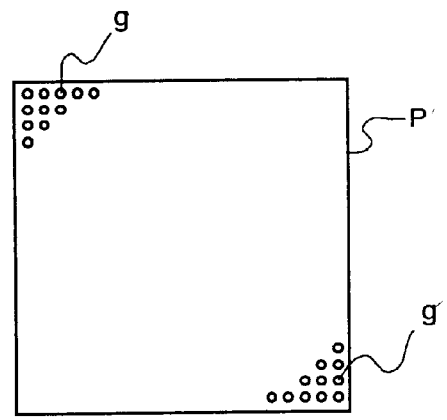
FIGS. 2A to 2D are explanatory views showing a format and address setting.

At first description is made for formats used in this invention. The printing apparatus 100 forms an image on a form P with a group of fine dots. In the print head 3, the pins 31 are arrayed in a row. For this reason, description is made assuming a case where dots g formed on the form P are arrayed in a matrix form as shown in FIG. 2A. This format is realized by quartering a surface of the form P and then further dividing a divided surface area repeatedly as shown in FIGS. 2A to 2D. Physically, division of a surface area can be made down to a dot unit, but a surface area can simulatedly be further divided by controlling the dot g forming state (for instance, by making dot size smaller or lowering density of ink). It should be noted that, although a case of quartering a screen is shown in FIGS. 2A to 2D, the format is not limited to this one. For instance a format in which division is made only in the longitudinal direction is allowable.

Figure 2B:
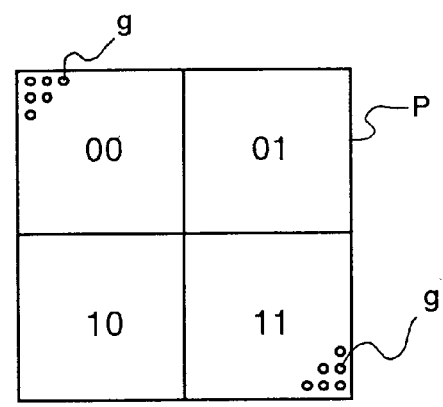
Figure 2C:
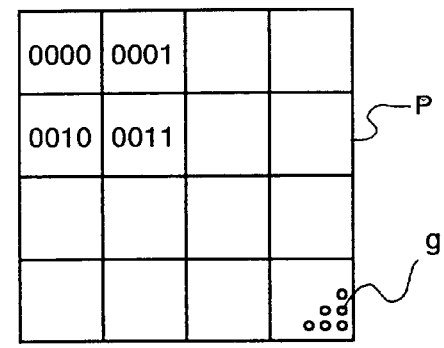
Figure 2D:
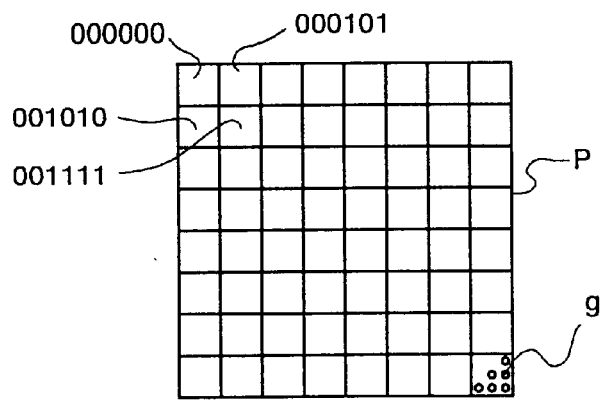

Next description is made for address setting. As shown in FIGS. 2B to 2D, each time quartering is made, 2-bit addresses of "00", "01", "10", and "11" are given to the divided unit surface areas. Namely a same address is given to all dots belonging to one divided unit surface area. When a divided unit surface area is further quartered, 2-bit addresses of "00", "01", "10", and "11" are added to the end of the addresses respectively. For instance, when a divided unit surface area having an address of "00" is further quartered, the further divided unit surface area of a form realized by adding "00" to "11" behind "00", namely "0000", "0001", "0010", and "0011". As described above, address setting is executed each time a screen is divided. It should be noted that, so long as a divided unit surface area can be identified, the 2-bit expression form is not always required for address setting.

As the pins 31 on the pin head 3 are arrayed in a row, dots g are placed on a form in a matrix form by moving the form P in actual printing operations. Namely, addresses are given assuming a state where dots g are placed in a matrix form, but actually dots g are formed by the pins 31 on the print head 3. For this reason, addresses assigned to the pins 31 are changed in correlation to movement of the form P. With this configuration, substantially an address is given to each of the dots g arrayed in a matrix form. The address given to each dot g is stored in the memory 6.

Figures 3, 4:
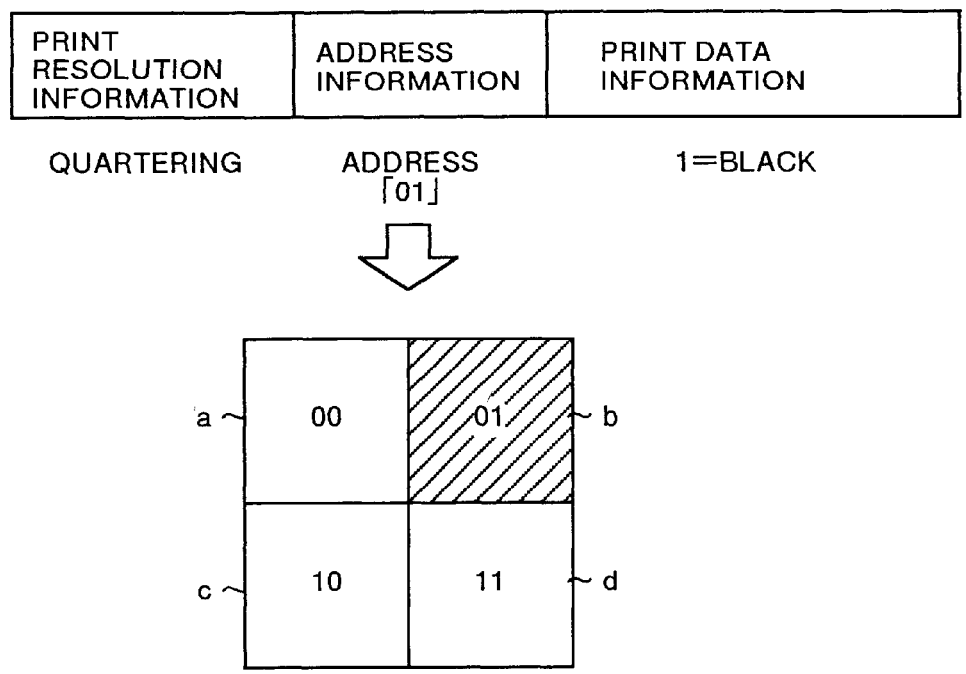
FIG. 3 is an explanatory view showing structure of a print signal supplied to the printing apparatus shown in FIG. 1.
FIG. 4 is an explanatory view showing a relation between a print signal and an image.

FIG. 3 is an explanatory view showing a structure of a print signal supplied to the printing apparatus 100. A print signal comprises display resolution information, address information, and print data information. The print resolution information indicates times of division of a surface of a print form. The address information identifies a divided unit surface area, and is expressed with 2 bits as described above. The print data information indicates contents of display in a divided unit surface area identified according to the address information. For instance, as shown in FIG. 4, the print resolution information "0001" indicates quartering of a screen (to areas a to d). The address information "01" indicates a division unit of the area b. The print data information "1" indicates for instance "painting out" the identified area b.

Figure 5:
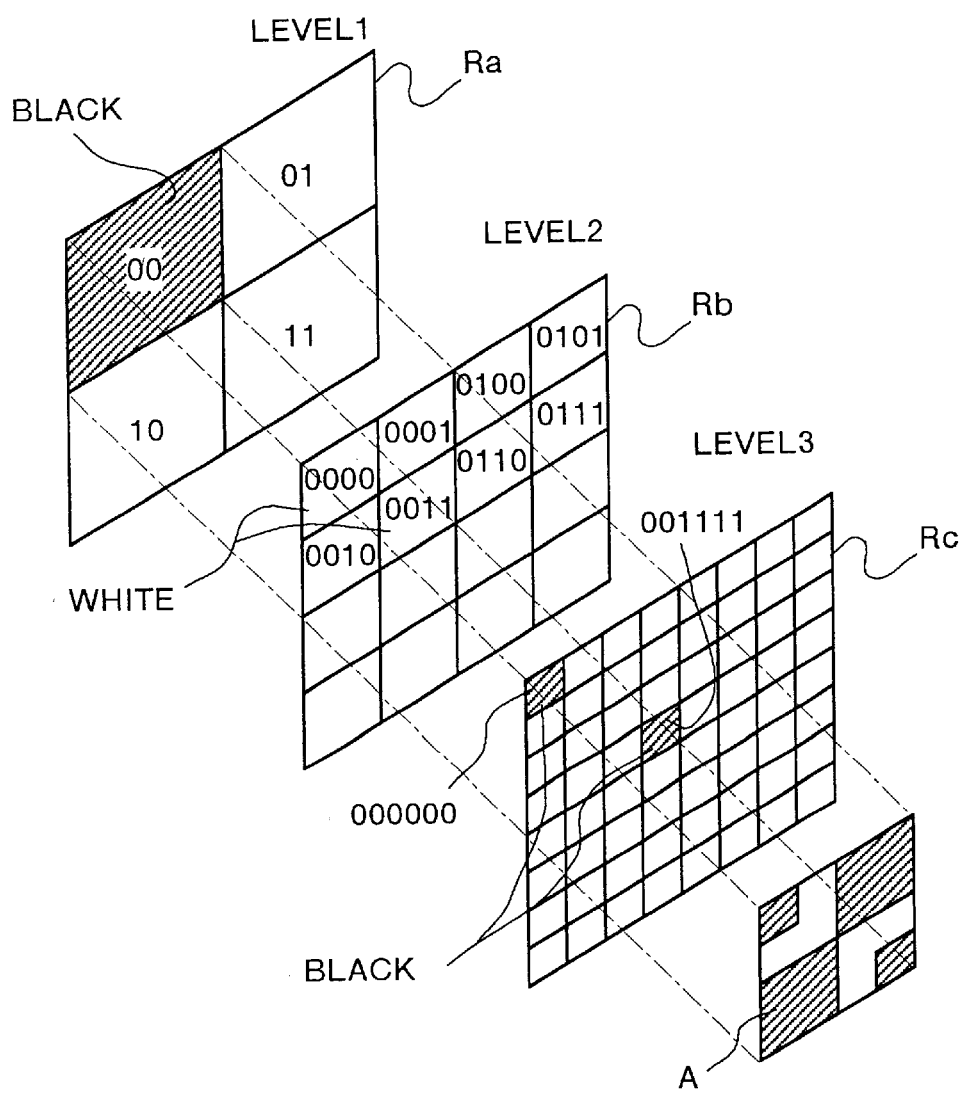
FIG. 5 is an explanatory view showing a case where print image is formed by using a simple image.
Figure 6A:
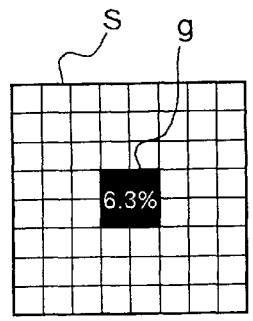
FIGS. 6A to 6H are explanatory views showing an example of a dither pattern comprising a group of dots.
Figure 6B:
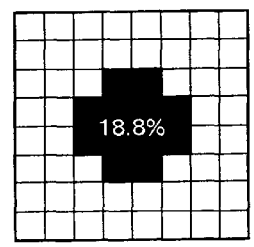
Figure 6C:
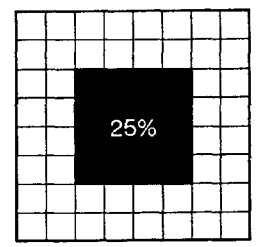
Figure 6D:
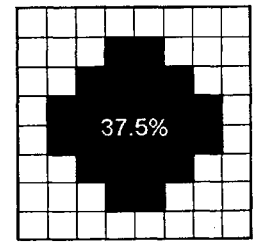
Figure 6E:
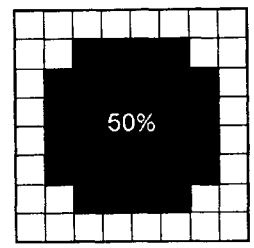
Figure 6F:
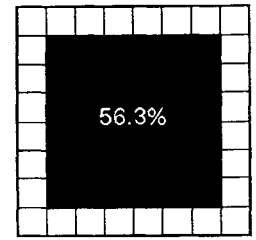
Figure 6G:
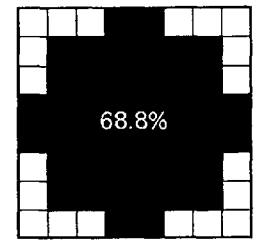
Figure 6H:
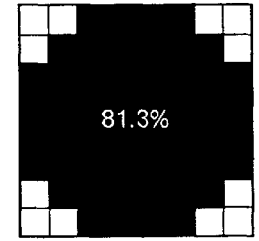

This printing apparatus 100 forms an image by superimposing layers at different levels respectively. FIG. 5 shows a case where a print image is formed by using a simple image. To obtain a print image A, a divided unit surface area having the address "00" in quartering (level 1: layer Ra) is specified as "black". Next the divided unit surface areas having the addresses of "0000" and "0011" in twice-quartering (level 2, layer Rb) are specified as "white", and divided unit surface areas having the addresses of "000000" and "001111" in thrice-quartering (level 3: layer Rc) are specified as "black". In this state, which of the layers Ra to Rc at the three levels is higher can not be determined, so that the principle of "a layer at a higher level is preferentially treated" is previously decided.

Figure 7:
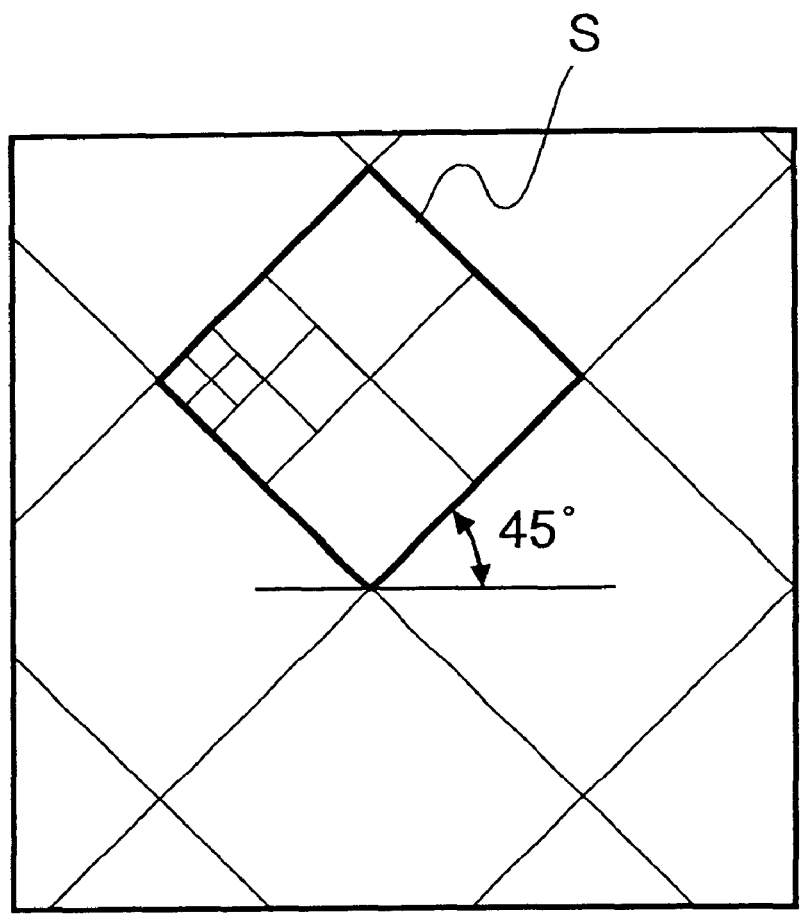
FIG. 7 is an explanatory view showing a case where a format is changed so that a cell is inclined by 45 degrees.

Although a printed image is expressed with a group of dots, also this print image can be subjected to the dither processing. FIGS. 6A to 6H show examples of a dither pattern based on a group of dots. At first, by changing addresses in a cell S identified with an address, it is possible to change a dot occupation ratio in the cell as shown in FIGS. 6A to 6H. Namely, by changing addresses around a dot to the same address, a form of the dot g can easily be changed. Also various types of dither pattern can be obtained according to each address changing mode. For instance, also a distributed type of dither pattern can easily be obtained. It should be noted that address changing is made by the address changing section 52. Also it is possible to incline a cell S by a certain degree by changing a format with the format changing section 51. FIG. 7 shows a case where the format is changed so that the cell S is inclined by 45 degrees.

Figure 8:
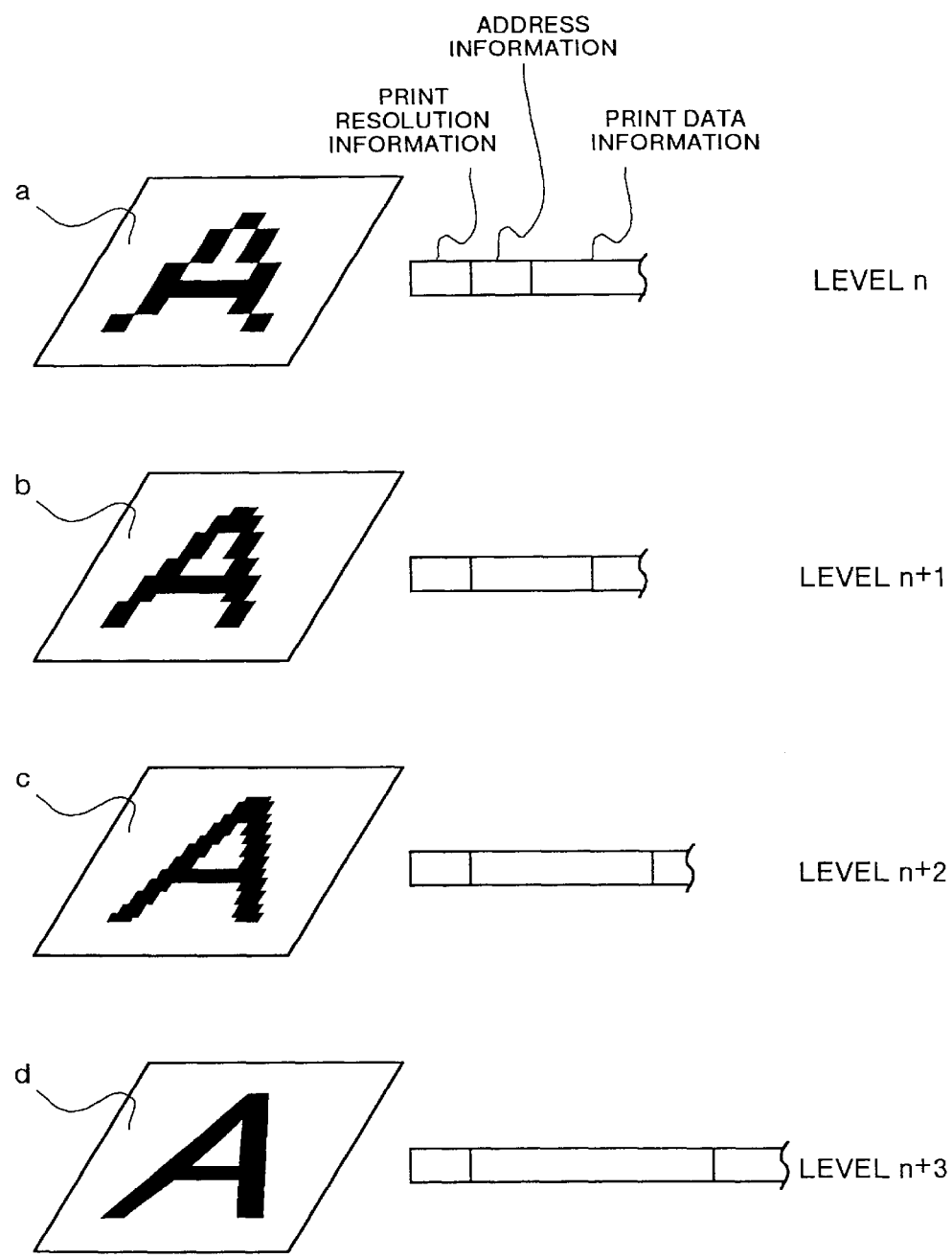
FIG. 8 is an explanatory view showing a case where a print image with desired resolution is obtained.

With the printing apparatus 100, it is possible to obtain a print image with desired resolution. Description is made for a case where character "A" is printed with reference to FIG. 8. A display signal relating to this character "A" has a structure comprising a plurality of layers (layers a to d) having resolution from level n to level n+3. As the level becomes higher, also resolution of a print image becomes higher. A display signal at a required level is selected according to a purpose of printing. When a level is selected, a corresponding layer is extracted by the format changing section 51. In this figure, when for instance the level n+2 is selected, the layer c is extracted. Printing is executed with the resolution at this level n+2. Selection of resolution can be made in the side of the printing apparatus 100.

Figure 9:
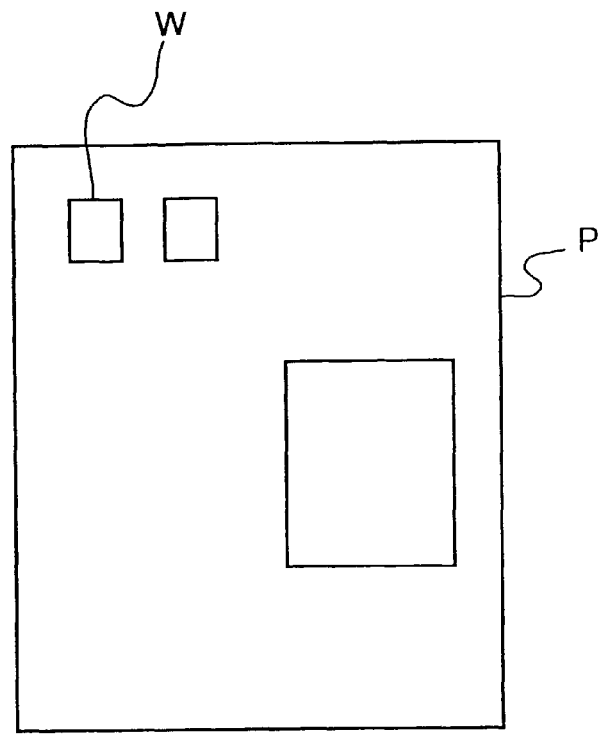
FIG. 9 is an explanatory view showing a case where a print image with another desired resolution is obtained.
Figure 10:
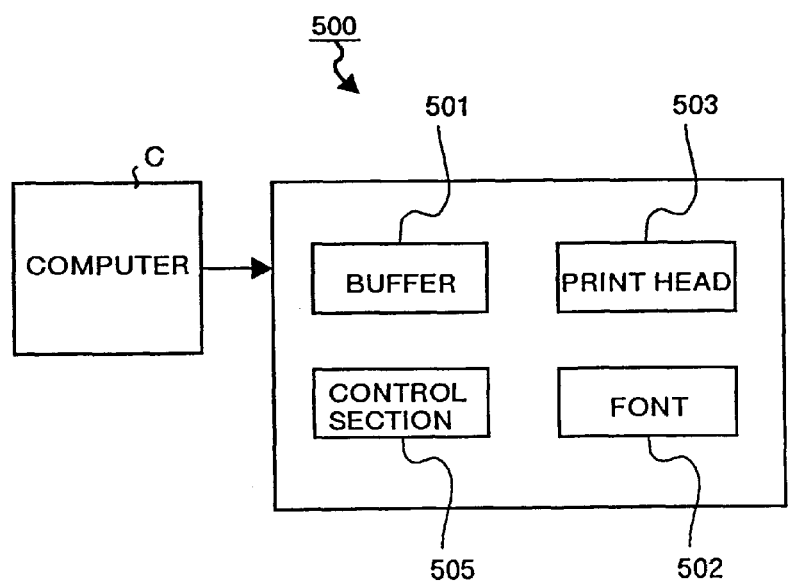
FIG. 10 is a block diagram showing an example of a printing apparatus based on the conventional technology.
Figure 11:
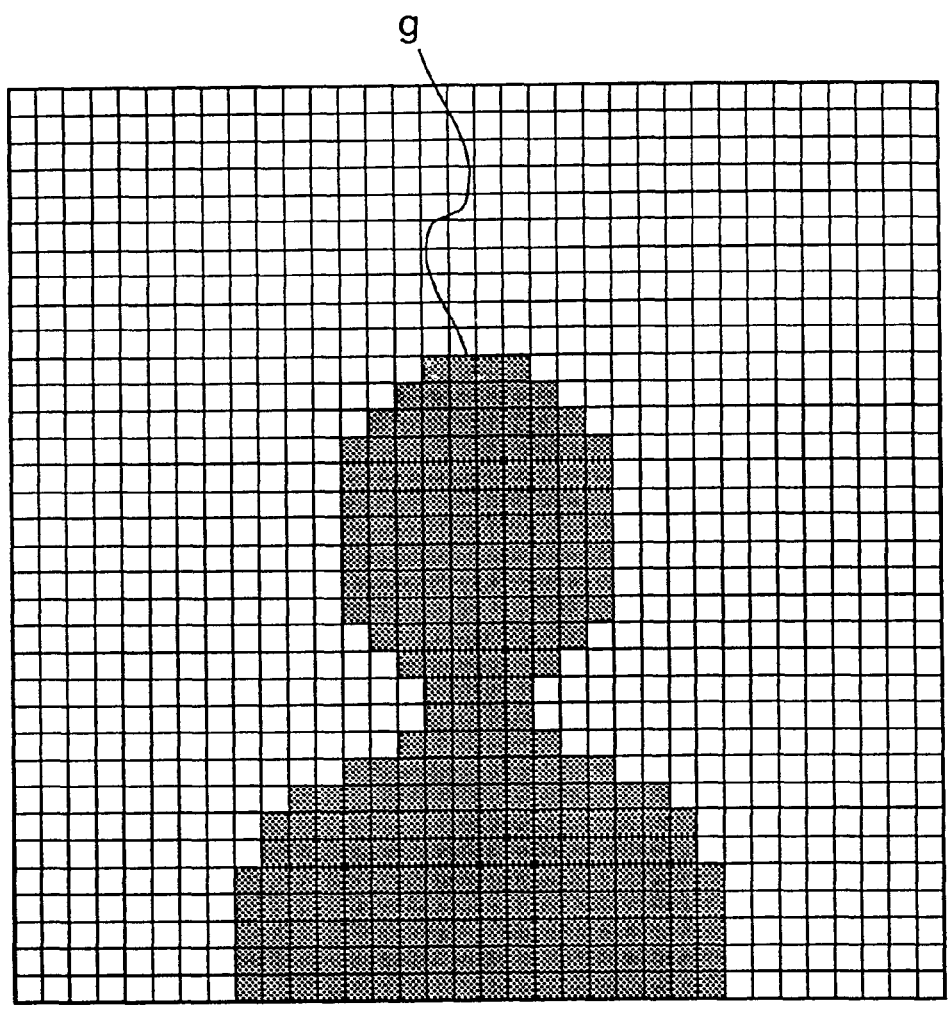
FIG. 11 is a reference view for illustrating a data transfer system in the printing apparatus shown in FIG. 10.

In the conventional type of printing apparatus, sometimes enlarged printing is made for such reasons as that it is desired to check details of a print image, but in that case an obtained image is rather rough. For, even if an image is enlarged, the resolution is unchanged. However, in the printing apparatus 100 according to the present invention, an image signal is based on the structure consisting of multiple layers, so that, when an image is printed with a layer at a high level (with high resolution), a beautiful image can be obtained even when enlarged. On the other hand, for instance, when it is desired to know only layout, as only a position of the image should be known, printing with low resolution is allowable. For instance, only a frame W may be printed on the form P without dividing a screen (at level 0) as shown in FIG. 9.

As described above, with the printing apparatus according to the present invention, a print image is formed with an array of dots displayed on a surface of a printing medium, a specific address is given to each of the dots, each dot is identified according to the specific address given to the dot, and the dot is displayed on a surface of a printing medium, so that, so long as there exists a correlation between a dot and an address, an image can be formed by identifying the address. Also even when an address is changed, an image can be formed so long as the address can be identified. A same address may be given to a plurality of dots, so that print data transfer efficiency can be made higher by reducing a data rate. Further resolution of a print image can freely be set according to an address setting mode.

With the present invention, division of a surface of a printing medium is repeatedly executed by dividing a surface of the printing medium and further dividing the divided unit surface area on and on. And a divided unit surface area in each dividing step is identified with bits, and print data is supplied thereto. Namely if a divided unit surface area in each dividing step can be identified with bits, it is not necessary to print an entire image in divided small areas, which makes it possible to reduce print data. Also if print data is prepared for each dividing area, printing can be made with desired resolution.

With the printing apparatus according to the present invention, high resolution print data for realizing a print image with high resolution and low resolution print data for realizing a print image with low resolution are prepared, and one print image is formed by combining the high resolution print data with the low resolution print data, so that printing corresponding to the resolution can be made, and also a volute of print data is efficiently adjusted to the minimum effective level. For this reason, the transfer efficiency can be improved.

With the printing apparatus according to the present invention, a print image is formed with an array of dots displayed on a surface of a printing medium. And, a particular area of the surface of a printing medium is repeatedly divided, and each time division is made, a first address is given to each divided unit surface area, then each screen identified according to the first address is further divided with a second address given to each further divided unit surface area, and thus division of a surface of a printing medium is repeatedly executed with an address given to a divided unit surface area in each dividing step according to the necessity, and an image is formed on the surface of printing medium by supplying print data corresponding to each divided unit surface area identified as described above to the print image forming unit. With this configuration, by forming a print image combining larger and smaller divided unit surface areas, a volume of print data can be suppressed. Also as division proceeds, a divided unit surface area becomes smaller, and resolution of an image formed with the smaller divided unit surface areas becomes higher. When layouting an image, by forming an image with larger divided unit surface areas in earlier dividing step, a volume of print data can be reduced. Further movement of a print image can easily be made by changing addresses, which is convenient in such works as proofreading.

With the printing apparatus according to the present invention, a print image is formed with an array of dots displayed on a surface of a printing medium. Then a particular range of the surface of printing medium is repeatedly executed, and each time division is executed, a first address is given to each divided unit surface area, then each screen identified according to the first address is further divided with a second address given to each further divided unit surface area, and thus by repeatedly dividing a surface of a printing medium and giving an address to each divided unit surface area according to the necessity, a print image with resolution corresponding to each division level is prepared with the divided unit surface area at the division level identified according to the address, and an image is formed on the surface of printed medium by supplying print data corresponding to each divided unit surface area identified as described above to the print image forming unit. In this step, a desired division level can be selected. For this reason, desired resolution of a print image can be selected.

With the printing apparatus according to the present invention, each surface area is quartered, and each divided unit surface area is expressed with a 2-bit address. Namely, a print image is formed with an array of dots displayed on a surface of a printing medium, and a particular range of the surface of printing medium is repeatedly quartered with 2-bit first addresses of "00", "01", "10", and "11" given to the quartered unit surface areas, then each quartered unit surface area is further quartered with 2-bit second addresses of "00", "01", "10", and "11" given to the further quartered unit surface areas respectively, and thus a print image is formed on the surface of printing medium by repeatedly dividing a surface of the printing medium and giving an address to each divided unit surface area, identifying each divided unit surface area according to the address given thereto, and supplying print data corresponding to each divided unit surface area identified as described above to the print image forming unit. For this reason, a format treatment is very easy.

With the printing apparatus according to the present invention, when division is executed down to a dot unit or below, the dot forming mode can be changed by, for instance, making smaller the dot size. With this feature, resolution of a print image can further is improved.

This application is based on Japanese patent application No. HEI 9-271613 filed in the Japanese Patent Office on Oct. 3, 1997, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A printing apparatus comprising:

a memory;

a print image forming unit for forming a print image on a printing medium with dot arrays using a print element for each dot; and a print image control unit for controlling the formation of an image with a desired resolution, said control unit being operative to (1) assign an address specific to each of said dots on the basis of its location on said printing medium, (2) identify each dot according to said address specific to said dot, (3) control storage and retrieval of information for each said dot, and (4) control presentation of retrieved information for each dot on a printing medium surface with said print image forming unit based on said assigned address, wherein addresses are assigned to said print elements and are changed in correlation to movement of the print medium in a printing operation.

2. A printing apparatus comprising:

a printing medium surface dividing unit for dividing a print medium surface according to a particular format and successively repeating division of the print medium surface by further dividing a divided unit surface area, each division step resulting in a plurality of divided unit surface areas with a common size; and a print data supply unit for identifying each divided unit surface area resulting from a given division step with an equal number of address bits and supplying print data to a divided surface area in accordance with the address bits identifying said divided surface area.

3. A printing apparatus comprising:

a print mechanism for producing on a print medium surface an image represented in a plurality of resolutions by corresponding data concurrently stored in a memory, said print mechanism being operative to print both high resolution and low resolution images; and a print data supply unit for selectively providing both high resolution print data for realizing a high resolution print image and low resolution print data for realizing a low resolution print image, whereby said print mechanism is operative to form a print image by selectively combining the high resolution print data with the low resolution print data.

4. A printing apparatus comprising:

a print image forming unit for forming a print image on a printing medium surface with dot arrays; and a print image control unit for controlling the formation of an image with a desired resolution, said control unit being operative to:

(1) generate unit surface areas corresponding to said desired resolution by repeatedly dividing a particular area of said printing medium surface to form a plurality of first divided unit areas and assigning a first address to each first divided unit area, then further dividing each first unit area identified according to the first address to form a plurality of second divided unit areas and assigning a second address to each second divided unit area, and then further dividing each second divided unit area as needed into further unit areas to achieve a desired resolution and assigning an address to each further divided unit area, (2) identify each divided unit area according to said given address, and (3) supply print data corresponding to said identified divided unit area to said print image forming unit, whereby an image is formed on said printing medium surface at the desired resolution.

5. A printing apparatus according to claim 4 for changing a dot forming state according to said divided state when division of each divided unit surface area in each division step down to said dot unit or below.

6. A printing apparatus comprising:

a print image forming apparatus for forming a print image on a printing medium surface with dot arrays, and a print image control unit for controlling the formation of an image with a desired resolution, said control unit being operative to:

(1) generate unit surface areas corresponding to said desired resolution by repeatedly dividing a particular area of said printing medium surface to form a plurality of first divided unit surface areas and giving a first address to each first divided unit surface area, further dividing each first unit surface area identified according to the first address to form a plurality of second divided unit surface areas and giving a second address to each second divided unit surface area, then repeatedly dividing each second divided unit surface area as needed into further unit surface areas to achieve said desired resolution and giving an address to each further divided unit surface area according to the necessity to form a print image with resolution corresponding to each division level, (2) select an arbitrary division level, (3) identify said divided unit surface area at the division level according to said address, and (4) supply print data corresponding to said identified divided unit surface area to said print image forming unit whereby an image is formed on said printing medium surface at the desired resolution.

7. A printing apparatus according to claim 6 for changing a dot forming state according to said divided state when division of each divided unit surface area in each division step down to said dot unit or below.

8. A printing apparatus comprising:

a print image forming unit for forming a print image on a printing medium surface with dot arrays; and a print image control unit for controlling the formation of an image with a desired resolution, said control unit being operative to:

(1) generate unit surface areas corresponding to said desired resolution by repeatedly quartering a particular area of said printing medium surface and giving first 2-bit addresses, of "00", "01", "10", and "11" to said quartered unit surface area respectively, further quartering a quartered screen identified according to the first address and giving second 2-bit addresses of "00", "01", "10", and "11" to the further divided surface areas, respectively, repeatedly dividing each divided unit surface area in each division step as needed into further unit surface areas to achieve said desired resolution and giving an address to each further divided unit surface area according to the necessity to form a print image with resolution corresponding to each division level, (2) identify each further divided unit surface area according to said address, and (3) supply print data corresponding to said identified divided unit surface area to said print image forming unit, whereby an image is formed on said printing medium surface at the desired resolution.

9. A printing apparatus according to claim 8 for changing a dot forming state according to said divided state when division of each divided unit surface area in each division step down to said dot unit or below.

* * * * *